Jan. 27, 1970   F. J. CALLAHAN, JR., ETAL   3,491,789
BELLOWS VALVE
Filed July 28, 1966
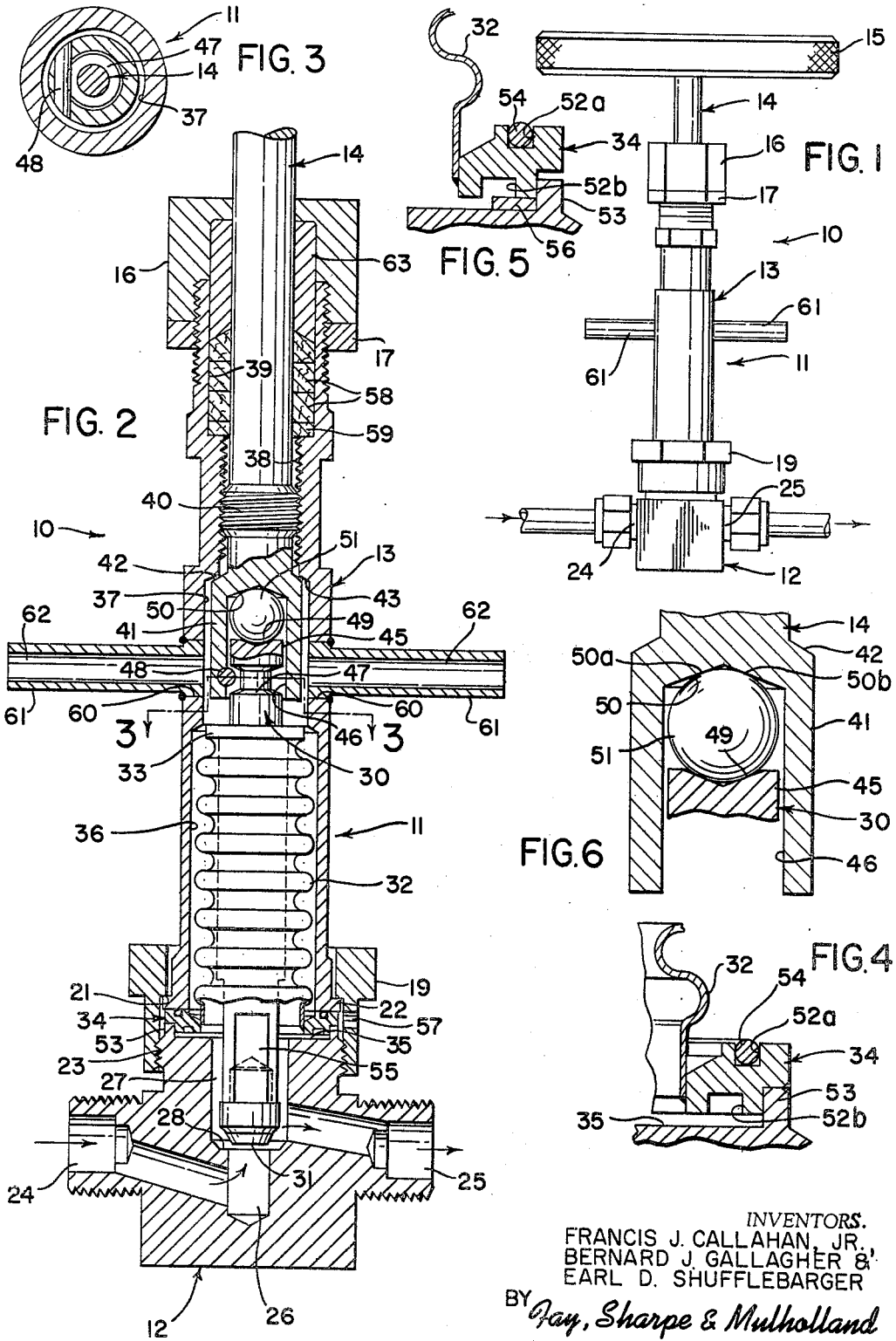
INVENTORS.
FRANCIS J. CALLAHAN, JR.,
BERNARD J. GALLAGHER &
EARL D. SHUFFLEBARGER
BY Fay, Sharpe & Mulholland
ATTORNEYS United States Patent Office 3,491,789
Patented Jan. 27, 1970

3,491,789
BELLOWS VALVE
Francis J. Callahan, Jr., Chagrin Falls, Bernard J. Gallagher, Cleveland Heights, and Earl D. Shufflebarger, Bedford, Ohio, assignors to Nupro Company, Cleveland, Ohio, a corporation of Ohio
Filed July 28, 1966, Ser. No. 568,466
Int. Cl. F16k *49/00, 25/00, 31/50*
U.S. Cl. 137—340     16 Claims

ABSTRACT OF THE DISCLOSURE

A valve which includes a base portion with a passageway therethrough connecting an inlet with an outlet. A bonnet secured to the top of the base envelops a valve stem. Valve seat means circumscribing the passageway in the base is adapted to intermittently be engaged by the lower end of the stem to seal the passageway against flow. A bellows is received within the bonnet and surrounds the stem. One end of the bellows is attached to the stem in fluidtight relationship and the other end of the bellows is secured to a ring clamped between the base and the bonnet. An actuator is provided to which the stem is joined in a socket positioned above the bellows. The actuator is adjustable relative to the valve seat by means of a threaded connection with the interior of the bonnet. The male and female threads forming the connection are of diverse hardness.

---

This invention relates to valves and more particularly to a bellows valve which offers cryogenic, high temperature, vacuum and high pressure capabilities.

More specifically, the valve comprises an all welded construction with a high pressure bellows as a primary seal on the stem of the valve. Secondary or backup seals are provided in case of bellows rupture with the secondary seals comprising a self-energizing O-ring which prevents leakage at the juncture of the bonnet and the valve body and a packing at the upper end of the stem to prevent leakage around the actuator. In addition, the bonnet may include a tube stub welded to the bonnet and in communication with the interior of the valve. The tube stub provides a means whereby either a vacuum may be produced above the bellows during cryogenic service or pressure may be admitted to the interior of the valve on the outside of the bellows to permit higher pressure service. In addition, the tube could be used as a means to activate an alarm in the event of bellows failure. A pair of tube stubs may be welded to the bonnet, each being in fluid communication with the interior of the bonnet. This later design lends itself to a system where either cryogenic or high temperature media is passing through the valve and valve operation is of primary concern. During high temperature operation, a media capable of passing through the tube stubs and circulating in the valve could continually dissipate the heat or, during cryogenic service, an inert gas could be passed through the tube stubs to provide satisfactory valve operation. An additional feature of the valve design is the provision of a highly polished, hardened ball bearing interposed between the stem actuator and the valve stem which reduces the possibility of torque being transmitted to the bellows. The diameter of the ball bearing is as large as possible to reduce the unit load and minimize the possibility of galling.

A further feature of the invention is a novel ring design for sealing the bonnet to the body whereby the ring is so designed that two replaceable seals may be employed with the ring or a metal-to-metal seal may be achieved. An additional alternative is a hermetic seal wherein the ring is welded in position.

Other features of the valve will become more apparent upon a complete reading of the following description and perusal of the attached drawings.

In the drawings:

FIG. 1 is a view in elevation of the valve;

FIG. 2 is an enlarged elevation view of the valve of FIG. 1 with parts in section to illustrate the details of the valve;

FIG. 3 is a view taken along lines 3—3 of FIG. 2;

FIG. 4 is an enlarged fragmentary section of the secondary seal between the bonnet and the valve body;

FIG. 5 is an enlarged fragmentary section of an alternate embodiment of the seal between the bonnet and the valve body;

FIG. 6 is an enlarged fragmentary section of the cup-shaped actuator and ball.

Referring to FIG. 1, the valve 10 includes a valve body indicated generally by the reference numeral 11. The valve body consists of a base portion 12 and an elongated bonnet portion 13. An actuating stem 14 projects upwardly from the bonnet 13 and an actuating handle 15 is secured to the stem. A gland nut 16 is threadably received over the upper end of the bonnet 13 and a jam nut 17 locks the gland nut 15.

Referring now to FIG. 2, the bonnet nut 19 has a flanged portion 21 which engages a flange 22 on the lower end of the bonnet 13. The bonnet nut is threadably connected to the base portion by the threads 23. The base 12 is provided with an inlet 24 and an outlet 25, the former of which extends into a bore 26 which is coaxial with an enlarged bore 27. A substantially radially extending shoulder 28 is formed at the juncture of the bores 26, 27 and provides a seat. Cooperating with the valve seat 28 is a valve stem 30 which includes a tip 31. The tip may be made as a separable unit so that it may be removed and other tips of different material substituted.

The stem 30 is generally cylindrical in configuration and is slightly less than the inside diameter of a fluid impervious bellows 32 which surrounds a portion of the stem. The stem is only a few thousandths of an inch smaller than the enlarged bore 27 in the base 12 thus providing a guiding relationship between the bore 27 and the stem 30. Generally desirable guiding characteristics are attained if the portion of the stem 30 which is received in the bore 27 is at least equal to or greater in length than the diameter of the stem 30. An integral flange 33 is provided on the stem 30 adjacent the upper end thereof. The bellows 32, preferably metal such as stainless steel, is joined to the flange at one end by welding with the opposite end of the bellows being welded to a ring 34 which is received in a counterbore 35 in the base 12.

The bonnet 13 is provided with a central bore 36 in which the stem 30 and bellows 32 are received and a series of coaxial bores 37, 38 and 39. The valve actuating stem 14 extends through bores 38 and 39 into bore 37 with threads 40 on the stem cooperating with a correspondingly threaded portion in the bore 38. The end of the stem 14 projecting into bore 37 includes a cup-shaped end portion 41, with a frusto-conical shoulder 42 at the juncture of the stem 14 and the cup-shaped portion 41. The frusto-conical shoulder 42 cooperates with a similarly configured transverse shoulder 43 at the juncture of bores 37 and 38 to provide a back seat.

The upper end 45 of stem 30 extends into the recess 46 in the interior of the cup-shaped portion 41. A groove 47 is formed in the upper end of the stem 30 and loosely receives a pin 48 carried by the cup-shaped portion 41. The upper end of the stem 30 further includes a conical recess 49 with the apex of the recess 49 being on the longitudinal axis of the stem 30 and aligned with the apex of a similar conical recess 50 formed in the bottom of the recess 46 in the cup-shaped portion 41. A ball 51 is interposed between the upper end 45 of the stem 30 and the bottom of the recess 46, with portions of the ball being received in the conical recesses 49, 50.

The dimensional relationships between the cup-shaped actuator 41, the pin 48, the ball 51 and the recesses 49 and 50 together with the resilience of bellows 32 and the fluid pressure in the system cause the ball 51 to be retained in the recesses 49, 50. In this condition, the pin 48 is positioned centrally of the groove 47 and transmits no torque to the stem 30 during valve actuation. In the event the stem tip should stick to the seat for any reason, movement of the actuator stem 14 independently of stem 30 will move the pin 48 to a position in engagement with the side wall of the groove 47 thereby exerting a light but positive lifting force on the stem.

To further reduce the possibility of torque transfer to the bellows when actuating the valve, the ball 51 has a diameter as large as possible. The portion of the ball in the recess 50 contacts the walls of the recess at two areas 50a, 50b. A similar condition exists with respect to recess 49 resulting in a desirable distribution of the load and a consequent reduction in the unit load and the possibility of galling. As a further precaution against galling and wear, the ball 51 is highly polished and the surfaces of recesses 49, 50 in contact with the ball have a finish of 63 microinches or better. The ball and all surfaces in contact with the ball have a hardness of at least 55 on the Rockwell "C" scale. A lubricant may also be used to reduce undesirable friction.

The ring 34 is of a special design and is adapted to be clamped between the bonnet and the base. Thus, the ring includes an upper circumferential groove 52a and a lower circumferential groove 52b, with the two grooves being laterally offset from each other. The width of the ring wall in the area of the circumferential groove 52a is substantially equal to and, in any event, no larger than the thickness of the bonnet wall at the lower end thereof. The base is provided with a circumferential boss 53 on which the ring 34 is adapted to be received with the portion of the ring in which the circumferential groove 52b is formed protruding into the counterbore 35. The width of the ring wall in the area of the circumferential groove 52b is such that the ring extends inwardly from the boss 53 to a position immediately adjacent the lower end of the bellows 32 whereby the bellows may be welded to the ring. The welding of the bellows to the ring 34 and the flange 33 comprises a primary seal whereby fluid in the system is retained in the flow path within the interior of the bellows.

A peripheral interrupted portion 55 is formed along a portion of the length of the stem 30 to provide access for fluid to the interior of the bellows. In the event of bellows rupture or in the event that there should be a failure of the primary seals, a secondary sealing arrangement is provided. This secondary seal includes an O-ring or first sealing means 54 received in the circumferential groove 52a formed in the ring 34. This O-ring may be a flexible resilient material but is preferably a metallic O-ring with the O-ring being adapted to engage the lower surface of the bonnet and thereby prevent escape of fluid between the bonnet and the ring.

With the particular ring design disclosed, the maximum amount of flexibility in the type of secondary seals available is achieved. Thus, for example, illustrated in FIG. 4 is one type of secondary seal wherein the ring 34 is seated on the boss 53 and the ring is welded at the juncture of the ring and the boss thereby providing a hermetic seal. An alternative arrangement is illustrated in FIG. 5 wherein a metal gasket 56 is placed between the ring 34 and the bottom of the counterbore 35. With this arrangement, a metal-to-metal seal may be achieved wherein the metal O-ring engages the bonnet and the metal gasket 56 is in engagement with the base 12. With this arrangement, a metal-to-metal seal is achieved in a very confined area despite the fact that the metal seals are of the replaceable type.

A leak test port 57 is formed in the bonnet nut 19 adjacent the ring 34 whereby the integrity of the seal between the base, bonnet and ring 34 may be tested.

The secondary seal further includes packing material or second sealing means 58 disposed in the bore 39 around the actuating stem 14. As is apparent in FIG. 2, the packing is disposed between the metal stem 14 and the metal walls of the counterbore 39. A metal ring 59 is at one end of the gasket 58 and a metal compression cylinder 63 is disposed in the counterbore 39 at the other end of the gasket 58. With this arrangement, the gasket 58 is surrounded on all sides by metal surfaces so that a significant amount of compression may be placed on the gasket 58 by gland nut 16 to assure the proper sealing. The lock nut 17 prevents any possibility of the gland nut 16 becoming loosened from vibration.

The valve may further include a pair of opposed apertures 60 formed in the walls of the bonnet 13. Received in each of these apertures is a tube stub 61 which is welded to the bonnet and which is adapted to be connected to a fluid line. The tube stub includes a passage 62 in communication with the interior of the bonnet. By using a pair of tube stubs 61, the bonnet design lends itself to a system where either cryogenic or high temperature media is passing through the valve and valve operation is the primary concern. During high temperature operation, a media could be introduced through stubs 61 which would continually disipate heat allowing for satisfactory valve operation. During cryogenic service, an inert gas could be passed through the tubes.

It is also contemplated to use only one tube stub. In such applications, the tube could be used to pipe fluid or gas back to a reservoir or to activate an alarm in the event of bellows failure. Another potential use would be to allow a vacuum to be produced above the bellows during cryogenics service or, conversely, to permit pressurization of the valve on the outside of the bellows to attain higher pressure service.

The valve of the instant invention is designed for use in a great diversity of different applications including high pressure applications. In high pressure applications, the loading on the stem actuator 14 is substantial and frequently results in galling of the threads 40 and 38. As a result, the actuation of the valve becomes very difficult. It has been found that by providing the mating surfaces of the threads 40, 38 with a hardness of 55 or greater on the Rockwell "C" scale that the tendency to galling is overcome. By having a different degree of hardness on the threads 40 as compared to the hardness on the threads 38 so long as both threaded surfaces have a minimum hardness of 55, the tendency of galling is virtually eliminated.

I claim:
1. A valve comprising:
a valve housing having an inlet and outlet fluid passage therethrough;
a bore in said housing opening upwardly thereof and intersecting said fluid passage at its lower end;
a shoulder defining a valve seat at the intersection of the bore and the fluid passage;
stem means in said bore with a sealing tip on one end thereof adjacent said valve seat;
a bellows in said bore surrounding at least a portion of said stem means;
actuating means having one end extending into said bore in said housing;
a cup-shaped portion formed on one of said actuating means and said stem means with the adjacent end of the other of said actuating means and stem means being received in the recess defined by said cup-shaped portion;
said cup-shaped portion and said adjacent end having a groove formed in one of them and pin means carried by the other of them;
said pin means having a portion thereof positioned in said groove;
a conical recess in the bottom wall of the recess in said cup-shaped portion;
a conical recess formed in said adjacent end opening toward said conical recess in said cup-shaped portion;
the apices of said conical recesses being aligned with the longitudinal axis of said stem means;
ball bearing means interposed between said adjacent end and said cup-shaped portion with a portion of said ball bearing means being received in said conical recesses;
interengaging threads on said actuating means and in said bore with said threads being of diverse hardness.

2. The valve of claim 1 wherein said ball bearing means and said walls of said conical recesses in contact with said ball bearing means have a surface finish of at least 63 microinches.

3. The valve of claim 1 with said ball bearing means and said walls of said recesses in contact with said ball bearing means having a hardness of at least about 55 as measured on the Rockwell "C" scale.

4. The valve of claim 1 wherein the threads on said actuating means have a surface hardness of at least about 55 as measured on the Rockwell "C" scale.

5. The valve of claim 4 wherein the threads of the actuating means are harder than the threads in the bonnet.

6. A valve comprising:
a valve housing comprising a base portion and a bonnet.
said bonnet being supported on said base portion and said base portion having an inlet and outlet fluid passage therethrough;
a bore in said housing opening upwardly thereof and intersecting said fluid passage at its lower end;
a shoulder defining a valve seat at the intersection of the bore and the fluid passage;
stem means in said bore with a sealing tip on one end thereof adjacent said valve seat;
a bellows in said bore surrounding at least a portion of said stem means;
actuating means having one end extending into said bore in said housing;
means operatively interconnecting said actuating means with said stem means whereby said stem means may be displaced toward and away from said valve seat upon operation of said actuating means;
means fluid fluidtightly securing the upper end of said bellows to said stem means and the lower end of said bellows to said housing,
said securing means for the lower end of said bellows comprising a ring clamped between said bonnet and said base portion;
the lower end of said bellows being secured to the inner periphery of said ring;
means sealing the ring to said bonnet and said base portion;
a circumferential groove formed in the upper face of said ring;
said sealing means including a seal in said groove adapted to engage the lower transversely extending face of said bonnet; and
packing means in said bonnet surrounding a portion of said actuating means.

7. The valve of claim 6 including an opening formed in the wall of said housing;
a tube secured in said opening;
said tube having a passage communicating with said bore.

8. The valve of claim 7 wherein a second opening is formed in the wall of said housing;
a tube secured in said second opening with said latter mentioned tube having a passage communicating with said bore.

9. A valve comprising:
a base having inlet and outlet fluid passages therethrough;
a bore in said base opening upwardly thereof and intersecting said fluid passage at its lower end;
a shoulder defining a valve seat at the intersection of the bore and the fluid passage;
a counterbore formed in said base coaxial with said bore;
a bonnet supported on said base and having a central passage coaxial with said bore;
stem means in said bonnet passage having one end extending into said bore and being adapted to sealingly engage said valve seat;
actuating means having one end extending into said bonnet passage;
means interconnecting said actuating means with said stem means whereby said stem means may be displaced toward and away from said valve seat upon operation of said actuating means;
a bellows in said bore surrounding at least a portion of said stem means;
means securing the upper end of said bellows to said stem means;
ring means between said bonnet and said base;
the lower end of said bellows being secured to said ring means;
a circumferential groove formed in the upper face of said ring means;
first sealing means in said groove in engagement with the lower end of said bonnet;
a counterbore at the upper end of said bonnet passage;
second seal means in said bonnet counterbore surrounding a portion of said actuating means;
said second seal means being in engagement with the walls of said bonnet counterbore and said actuating means;
a metal ring having a dimension substantially equal to the dimensions of said second seal means disposed in the bottom of said counterbore and supporting said second seal means;
a compression cylinder surrounding said actuating means and extending into said counterbore in engagement with said second seal means;
gland nut means threaded over said bonnet and in engagement with said compression cylinder whereby a compressive force may be exerted on said second seal means.

10. The valve of claim 9 wherein said interconnecting means comprises:
a cup-shaped portion formed on said actuating means;
the other end of said stem means being received in the recess defined by said cup-shaped portion;
groove defining means in said other end of said stem means;
pin means carried by said cup-shaped portion;
said pin means having a portion thereof extending into said groove defining means;
a conical recess in the bottom wall of the recess in said cup-shaped portion;
a conical recess formed in said other end of said stem means and opening toward said conical recess in said cup-shaped portion;
the apices of said conical recesses being aligned with the longitudinal axis of said stem means;
ball bearing means interposed between said other end of said stem means and said cup-shaped portion with a portion of said ball bearing means being receivable in said conical recesses;
the diameter of said ball bearing means being sufficiently large so that said ball bearing means engages the walls of said conical recesses at points spaced from the apices of said recesses.

11. The valve of claim 10 wherein said ball bearing means and said walls of said conical recesses in contact with said ball bearing means have a surface finish of at least 63 microinches and a hardness of at least 55 as measured on the Rockwell "C" scale.

12. A valve comprising:
a valve housing comprising a base portion and a bonnet, said bonnet being supported on said base portion and said base portion having an inlet and outlet passage therethrough;
a bore in said housing opening upwardly thereof and intersecting said fluid passage at its lower end;
a shoulder defining a valve seat at the intersection of the bore and the fluid passage;
stem means in said bore with a sealing tip on one end thereof adjacent said valve seat;
a bellows in said bore surrounding at least a portion of said stem means;
actuating means having one end extending into said bore in said housing;
means operatively interconnecting said actuating means with said stem means whereby said stem means may be displaced toward and away from said valve seat upon operating of said actuating means;
means fluidtightly securing the upper end of said bellows to said stem means and the lower end of said bellows to said housing at a point between said opening and said fluid passage;
said securing means for the lower end of said bellows comprising a ring fixed between said bonnet and said base portion;
the lower end of said bellows being secured to the inner periphery of said ring; and
plural sealing means engaging the ring to seal between the ring and said bonnet and between said ring and said base portion with the outer circumference of said ring being substantially flush with the outer circumference of the juxtaposed base, the inner circumference of said bonnet being substantially flush with an upwardly extending shoulder on said ring.

13. The valve of claim 12 wherein said ring further includes a circumferential groove formed in the upper base thereof;
sealing means in said groove adapted to engage the lower end of said bonnet.

14. The combination of claim 12 wherein said sealing means between the ring and the base comprises a gasket in a counterbore in the base;
a portion of the ring extending into said counterbore in engagement with said gasket.

15. A valve comprising:
a base having inlet and outlet fluid passages therethrough;
a bore in said base opening upwardly thereof and intersecting said fluid passage at its lower end;
a shoulder defining a valve seat at the intersection of the bore and the fluid passage;
a counterbore formed in said base coaxial with said bore;
a bonnet supported on said base and having a central passage coaxial with said bore;
stem means in said passage having one end extending into said bore and being adapted to sealingly engage said valve seat;
actuating means having one end extending into said passage;
means interconnecting said actuating means with said stem means whereby said stem means may be displaced toward and away from said valve seat upon operation of said actuating means;
a bellows in said bore surrounding at least a portion of said stem means;
means securing the upper end of said bellows to said stem means;
ring means clamped between said bonnet and said base;
the lower end of said bellows being secured to said ring means;
a circumferential groove formed in the upper face of said ring means;
gasket means in said groove in engagement with a transversely extending face on the lower end of said bonnet; and
weld means sealing said ring to said base.

16. A valve comprising:
a valve housing having an inlet and outlet fluid passage therethrough;
a bore in said housing opening upwardly thereof and intersecting said fluid passage at its lower end;
a shoulder defining a valve seat at the intersection of the bore and the fluid passage;
stem means in said bore with a sealing tip on one end thereof adjacent said valve seat;
a bellows in said bore surrounding at least a portion of said stem means;
actuating means having one end extending into said bore in said housing;
means operatively interconnecting said actuating means with said stem means whereby said stem means may be displaced toward and away from said valve seat upon operation of said actuating means;
interengaging threads on said actuating means and in said bore with said threads being of diverse hardness;
the threads of the actuating means being harder than the threads in the bonnet; and
the threads on said actuating means having a surface hardness of at least about 55 as measured on the Rockwell "C" scale.

References Cited

UNITED STATES PATENTS

| | | | |
|---|---|---|---|
| 2,444,703 | 7/1948 | Jones | 137—340 |
| 2,704,650 | 3/1955 | Rand | 251—88 X |
| 2,848,187 | 8/1958 | Henry | 251—88 X |
| 3,101,094 | 8/1963 | McKenzie | 137—340 |
| 3,206,165 | 9/1965 | Salmon et al. | 251—335 |
| 3,278,156 | 10/1966 | Callahan et al. | 251—335 |
| 1,825,378 | 9/1931 | Wilson. | |
| 2,973,179 | 2/1961 | Kleinschmidt et al. | 251—86 |
| 3,070,117 | 12/1962 | Callahan et al. | 137—360 |
| 3,326,512 | 6/1967 | Clarke | 251—335 XR |
| 3,280,836 | 10/1966 | Callahan et al. | 251—205 XR |

HENRY T. KLINKSIEK, Primary Examiner

U.S. Cl. X.R.

251—88, 335